United States Patent
Bieselt et al.

(10) Patent No.: US 9,078,012 B2
(45) Date of Patent: Jul. 7, 2015

(54) VIEWING ANGLE SWITCHING FOR LIVE BROADCASTS AND ON DEMAND VIDEO PLAYBACK

(71) Applicants: Christoph Bieselt, Köln (DE); Andreas Jacobi, Köln (DE)

(72) Inventors: Christoph Bieselt, Köln (DE); Andreas Jacobi, Köln (DE)

( * ) Notice: Subject to any disclaimer, the term of this patent is extended or adjusted under 35 U.S.C. 154(b) by 215 days.

(21) Appl. No.: 13/647,413

(22) Filed: Oct. 9, 2012

(65) Prior Publication Data

US 2014/0101227 A1     Apr. 10, 2014

(51) Int. Cl.

| | |
|---|---|
| G06F 15/16 | (2006.01) |
| H04N 21/218 | (2011.01) |
| H04L 29/06 | (2006.01) |
| H04N 21/2187 | (2011.01) |
| H04N 21/2343 | (2011.01) |
| G06F 12/00 | (2006.01) |

(52) U.S. Cl.
CPC .... *H04N 21/21805* (2013.01); *H04L 29/06027* (2013.01); *H04N 21/2187* (2013.01); *H04N 21/2343* (2013.01)

(58) Field of Classification Search
USPC ............. 709/203, 223–229, 230–231, 250
See application file for complete search history.

(56) References Cited

U.S. PATENT DOCUMENTS

2014/0040216 A1*   2/2014   Thomas ................ 707/694

OTHER PUBLICATIONS

Jian-Guang Lou, Hua Cai, and Jiang Li A Real-Time Interactive Multi-View Video System Multimedia 2005, Nov. 6-11, 2005, Singapore. Multimedia '05 Proceedings of the 13th annual ACM international conference on Multimedia Media Communication Group, Microsoft Research Asia.*

* cited by examiner

*Primary Examiner* — Zarni Maung
(74) *Attorney, Agent, or Firm* — Chapin IP Law, LLC

(57) ABSTRACT

Methods and apparatus, including computer program products, for viewing angle switching for live broadcasts and on demand video playback. A method includes, in a media server residing in a network of interconnect computers, the media server including a processor and a memory, receiving a plurality of real-time video input streams and an associated session entity from a client device in the network, enabling a producer to select streams from the received plurality of real-time video input stream and assigned angles, recording the selected streams and angles in a media mix container, transcoding the selected streams and angles, and publishing the transcoded selected streams and angles to a content delivery network.

8 Claims, 3 Drawing Sheets

VIEWING ANGLE SWITCHING FOR LIVE BROADCASTS AND ON DEMAND VIDEO PLAYBACK

BACKGROUND OF THE INVENTION

The invention generally relates to live streaming and on demand video streaming, and more specifically to viewing angle switching for live broadcasts and on demand video playback.

According to a common definition of live video streaming, it is "multimedia that is constantly received by and presented to an end-user while being delivered by a streaming provider." In effect, live video streaming is a process of live video broadcast that enables viewers to watch an event online or on mobile devices (e.g., smart phones and tablet computers) and semi-mobile devices (e.g., laptops and desktop computers) in real time.

The use of video streaming is commonly used to deliver video data via the Internet and other networks. Typically, a video server divides a video program into segments, encodes each segment, and transmits the encoded segments via a network to a client device. The client device receives the encoded segments, decodes the segments, and presents the decoded segments in an appropriate sequence to produce a video presentation.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for viewing angle switching for live broadcasts and on demand video playback.

In an aspect, the invention features a method including, in a client device residing in a network of interconnect computers, the client device including a processor and a memory, a receiving a plurality of real-time video input streams from one or more video originating devices, associating the plurality of real-time video input streams with a session entity, assigning streams to angles, and sending the plurality of real-time video input streams with the associated session entity and angles to a media server in the network, the media server including a processor and a memory.

In another aspect, the invention features a method including, in a media server residing in a network of interconnect computers, the media server including a processor and a memory, receiving a plurality of real-time video input streams and an associated session entity from a client device in the network, enabling a producer to select streams from the received plurality of real-time video input stream and assigned angles, recording the selected streams and angles in a media mix container, transcoding the selected streams and angles, and publishing the transcoded selected streams and angles to a content delivery network.

In another aspect, the invention features a method including, in a client device residing in a network of interconnect computers, the client device including a processor and a memory, the memory including a video player, receiving transcoded video streams and angles in the video player, parsing and displaying the received transcoded video streams and angles, and enabling a user of the video player to switch angles of a selected received transcoded video stream in real-time.

Other features and advantages of the invention are apparent from the following description, and from the claims.

BRIEF DESCRIPTION OF THE DRAWINGS

The invention will be more fully understood by reference to the detailed description, in conjunction with the following figures, wherein.

DETAILED DESCRIPTION

Figure 1:
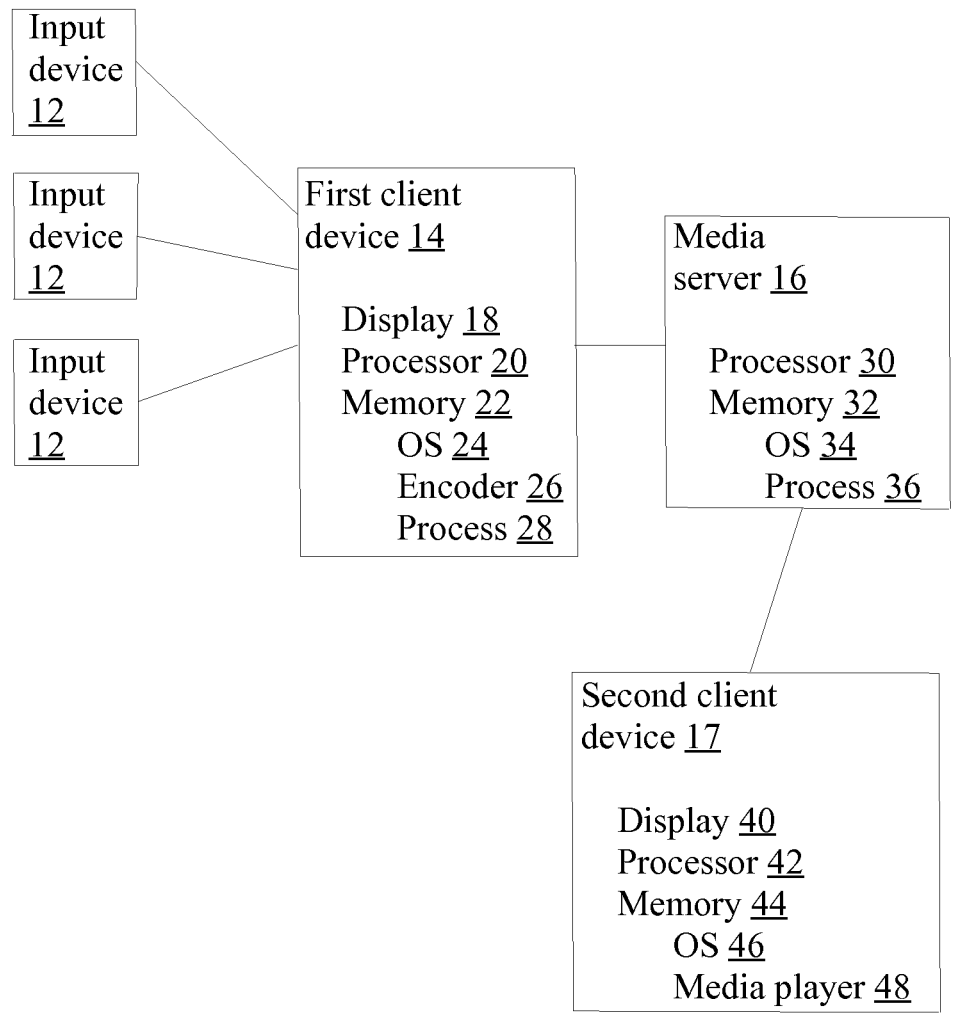
FIG. 1 is a block diagram of an exemplary system.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, a "viewer" refers to a consumer of a broadcast.

A "producer" uses tools, such as cloud based, collaborative and interactive live broadcasting solutions from MakeTV of Germany and incorporated herein by reference, to author a live broadcast.

A "participant" uses a call-in feature to participate in a live show.

"Production" refers to the entire process of producing a (live) show.

A "session" refers to a topical entity.

A "channel" groups shows.

A "show" is a single, continuous live or on demand media entity.

An "edit decision list (EDL)" refers to a timeline of a (live) video edit.

"Assets" refer to media elements used in a creation of a show.

"Tag" refers to a non-hierarchical keyword assigned to a piece of information.

The "Internet" refers to a worldwide collection of computer networks, cooperating with each other to exchange data using a common software standard.

Live video streaming, as described above, is a process of transmitting a video signal in real time over a network, such as the Internet, to one or more receiving stations. The receiving stations can be desktop computers, laptop computers, mobile devices, tablet computers, and so forth. Live video streaming often is viewed by a client with a media player. In general, a media player is a software program designed to play multimedia content as it streams in from a network such as the Internet, or from local storage on a hard drive or other resource. A media player might be expected to understand and translate several audio and video codecs, covering many digital music and video formats.

The present invention enables a producer of a live broadcast with an ability to define a certain number of viewing angles and for a viewing audience to freely switch between the viewing angles. Multiple viewing angles for a given scene enrich a viewing experience and provide context.

As shown in FIG. 1, an exemplary system 10 includes a number of input devices 12 linked to a first client device 14. The first client device 14 is linked to a media server 16 and the media server 16 is linked to a second client device 17. An example input device 12 is a camera that delivers a continuous input video stream to the first client device 14. Example first client devices 14 include, for example, a computer, a hardware encoding unit, a mobile device, and so forth. Example mobile devices include, for example, tablet computers running Android®, RIM® or iOS®, smartphones, personal data assistants (PDAs), and so forth. Example second client devices 17 include personal computers, laptops, netbooks, tablet computers, smartphones, and so forth.

The first client device 14 is characterized as at least including a display 18, a processor 20 and a memory 22. Memory 22 includes an operating system (OS) 24, such as Windows®, Linux®, Android® or iOS®, an encoding unit 26 and a client administration process 28. The encoding unit 26 may be implemented in software or hardware and is responsible for receiving a stream of video signals from the input devices 12, encoding the received video stream, and streaming the encoded video to the media server 16. Input streams are associated with a session tag, such as "LiveConcertXY," to generate a topical connection. The session tag is created by an owner with a unique identification (ID).

The client administration process 28 administers live stream sessions and assigns stream to angles.

The media server 16 is characterized by at least including a processor 30 and a memory 32. The memory 32 includes an operating system (OS) 34, such as Windows® or Linux®, and a media server administration process 36. A producer (not shown) uses the media server administration process 36 to manage received encoded streams from the encoding init 26, i.e., the producer selects the encoded streams to be used as angles and triggers a live broadcast.

The second client device 17 is characterized as at least including a display 40, a processor 42 and a memory 44. Memory 44 includes an operating system (OS) 46, such as Windows®, Linux®, Android® or iOS®, and a playback device 48 (e.g., media player).

The media server process administration process 36 manages incoming and outgoing streams, as well as recordings. All incoming streams are aggregated and the media server process administration process 36 determines which streams are selected to be redistributed and/or recorded and which streams are to be discarded.

The media server process administration process 36 collects recorded streams in a "Media Mix" container, typically a ZIP container, for re-use. Re-uses can include, for example, downloaded archives, use with third party editors, watch on demand after recording, and so forth.

In a live broadcast publishing, the media server process administration process 36 publishes the selected viewing angles to a content delivery network (CDN), which distributes them to the receiving playback device 48.

In an on demand publishing, the media server process administration process 36 reads the recorded streams from the Media Mix container, publishes the selected viewing angles to a content delivery network (CDN), which distributes them to the receiving playback device 48.

When received by the video player 48, the angles re delivered in two iterations off quality, i.e., full and proxy. The video player 48 can switch between angles using a graphical user interface (GUI) of the video player 48. More specifically, within the context of the video player's playback controls the angle switch is available. Triggered, it will display a list of available angles. A viewer can select a different viewing angle from this list and the main video will change accordingly.

As described above, for previewing purposes, as a viewer requests/selects a certain viewing angle from the list of available channels, it triggers a switch from proxy quality to full quality and the stream is displayed in the main playback menu. Should the viewer select a different viewing angle, the quality is switched back to the proxy stage for the previously established angle and the newly selected angle is displayed in the main playback window.

Figure 2:
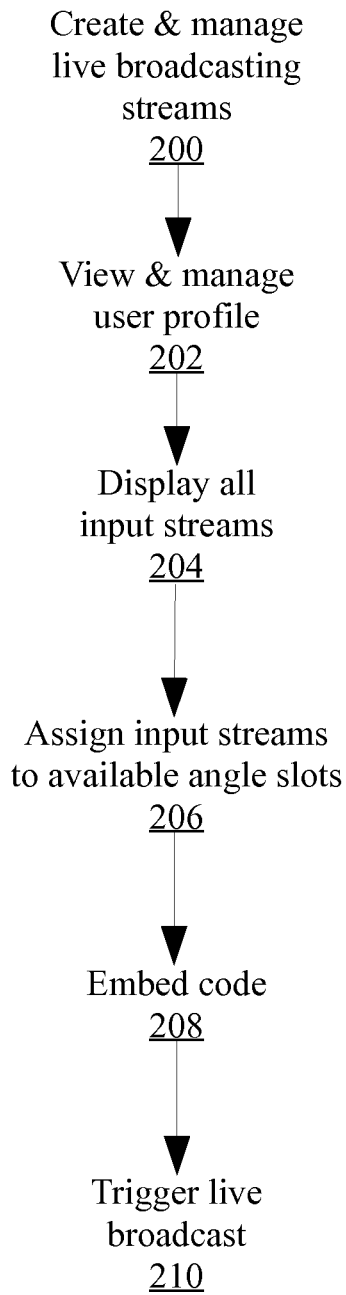
FIG. 2 is a flow diagram.

As shown in FIG. 2, the media server process administration process 36 includes creating and managing (200) live broadcasting sessions. A producer can view and manage (202) a user profile.

The media server process administration process 36 displays (204) all input sources that are associated with a respective session tag.

The media server process administration process 36 enables the producer to assign (206) the available input streams to the available angle slots. An angle slot can be either locked or auto-rotating, which means it automatically alternates through available input sources.

The media server process administration process 36 enables the producer to copy a link or embed code (208) to the session for distribution.

The media server process administration process 36 enables the producer to start a broadcast and trigger (210) a recording of live streams.

Figure 3:
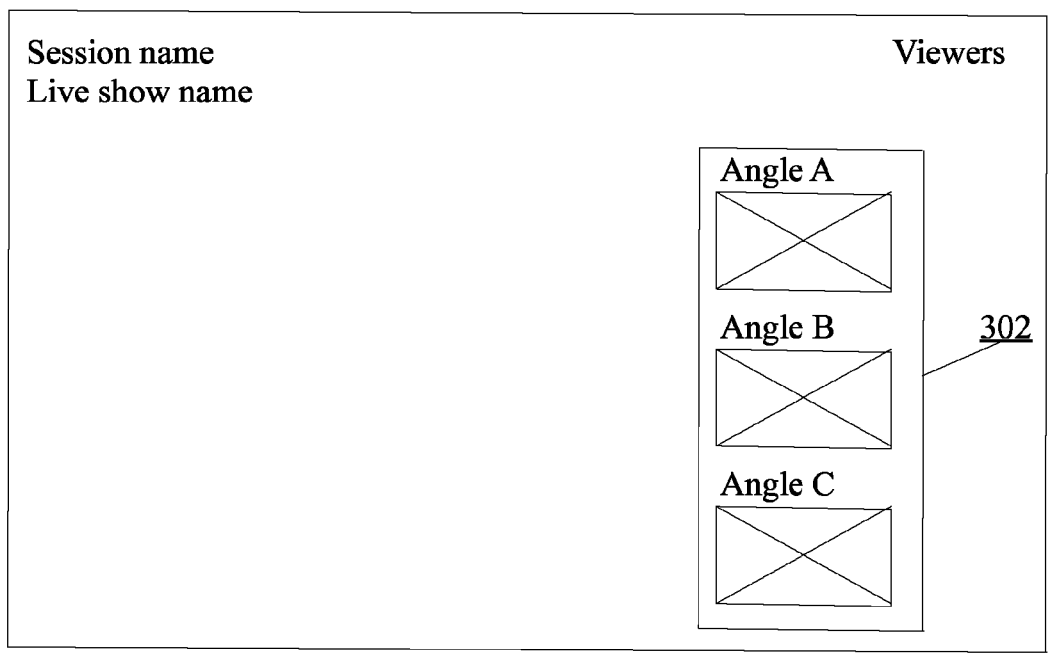
FIG. 3 is an exemplary graphical user interface (GUI).

As shown in FIG. 3, an exemplary video player 300 includes video player controls 302. Within the context of the video player's controls 302 the angle switch is accessible. Triggered, it will display a list of available angles with respective preview images. The list enables a user to select a different viewing angle and the main video display will change accordingly.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A method comprising:
   in a client device residing in a network of interconnect computers, the client device comprising a processor and a memory, receiving a plurality of real-time video input streams from one or more video originating devices;
   in the client device, associating the plurality of real-time video input streams with a session entity, the session entity representing a topical entity;
   in the client device, assigning streams to angles, each angle representing a remote view of activities on one or more media servers; and
   sending the plurality of real-time video input streams with the associated session entity and angles from the client device to the one or more media servers in the network, each media server comprising a processor and a memory.

2. The method of claim 1 wherein the plurality of real-time video input streams originate from a webcam, a camera or a mobile streaming application executing in a smartphone.

3. The method of claim 1 wherein the session entity is a tag.

4. The method of claim 3 wherein the tag represents a topical connection.

5. The method of claim 1 wherein the client device aggregates the plurality of real-time video input streams.

6. The method of claim 5 wherein the aggregation is performed by an administrative process in the client device.

7. The method of claim 1 wherein the one or more media servers aggregate the plurality of real-time video input streams.

8. The method of claim 7 wherein the aggregation is performed by an administrative process in the one or more media servers.

* * * * *